Figure 1:
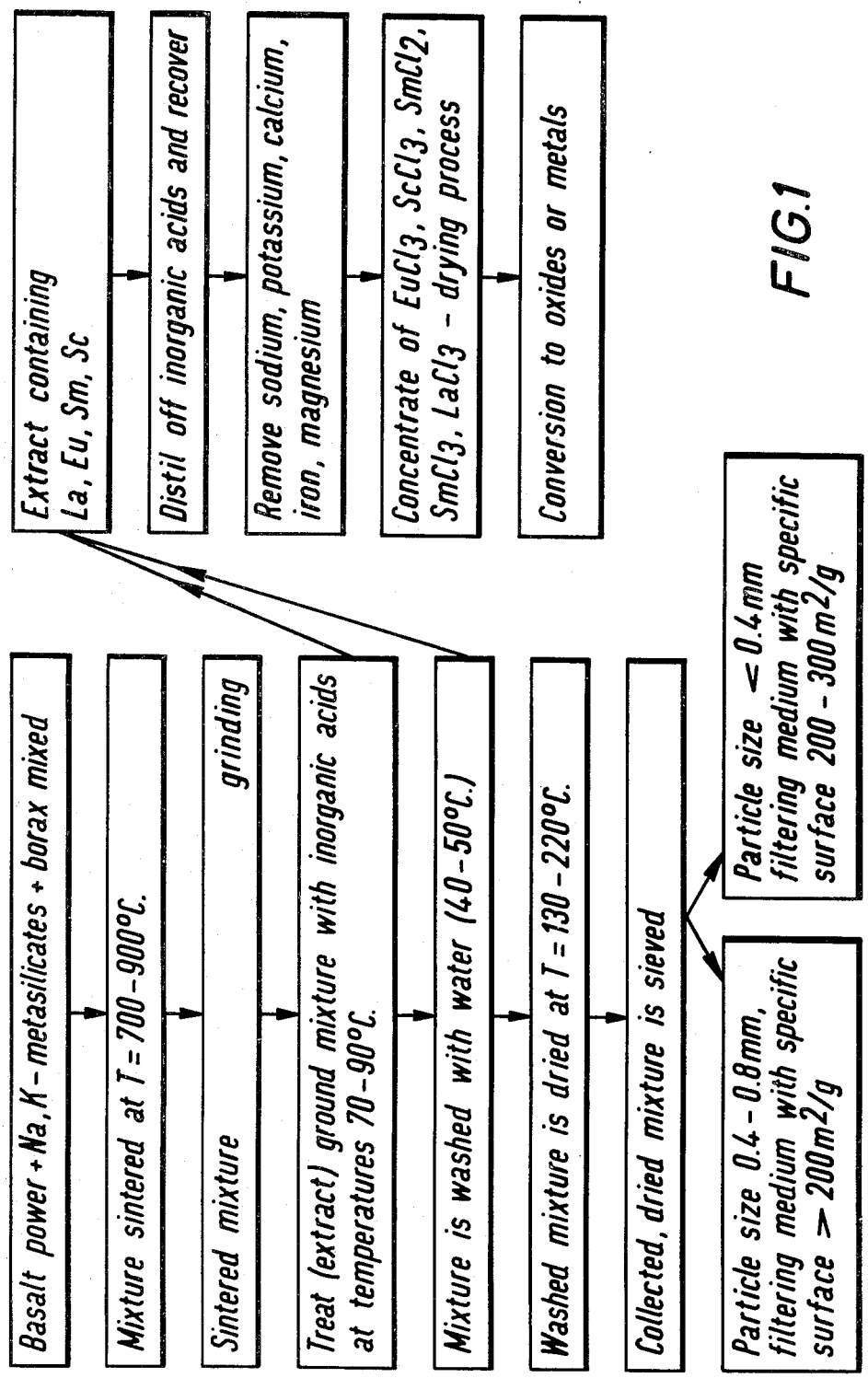

United States Patent [19]

Bumbalek

[11] 4,296,056

[45] Oct. 20, 1981

[54] METHOD FOR PREPARING A FILTER MEDIUM

[75] Inventor: Alois J. Bumbalek, Hanover-Kleefeld, Fed. Rep. of Germany

[73] Assignee: Hermann Wegener Schiffgraben, Fed. Rep. of Germany

[21] Appl. No.: 23,832

[22] Filed: Mar. 26, 1979

[30] Foreign Application Priority Data

Apr. 20, 1978 [DE] Fed. Rep. of Germany ....... 2817176

[51] Int. Cl.³ .............................................. B29H 7/20
[52] U.S. Cl. ..................................... 264/49; 264/115; 264/125
[58] Field of Search .................. 264/109, 115, 49, 125

[56] References Cited

U.S. PATENT DOCUMENTS

| 2,358,932 | 9/1944 | Knight | 264/109 |
| 3,761,571 | 9/1973 | Woodhead | 264/115 |
| 3,845,185 | 10/1974 | Kamigaito et al. | 264/125 |

Primary Examiner—Donald E. Czaja
Assistant Examiner—James R. Hall
Attorney, Agent, or Firm—Allegretti, Newitt, Witcoff & McAndrews

[57] ABSTRACT

A filtering medium having a large specific surface area is made by sintering basalt or lava powder with sodium or potassium metasilicate and borax. The powder before sintering and/or the sintered product after sintering is treated with inorganic acid and the extract may be processed to recover lanthanides.

8 Claims, 2 Drawing Figures

METHOD FOR PREPARING A FILTER MEDIUM

BACKGROUND OF INVENTION

This invention relates to a method of making a filtering medium which may have a large specific surface area.

PRIOR ART

It is known that a filtering medium with a surface area of about 200 m$^2$/g can be made from a boron-containing glass using inorganic acids, but a high expenditure of energy is necessary for this method in order to melt the glass. Temperatures exceeding 1400° C. are necessary for this purpose and in addition the large specific surface area can only be attained if the grain size of the material is smaller than 40$\mu$.

SUMMARY OF INVENTION

The present invention is intended to produce a filtering medium possessing a large specific surface area which for its production by a sintering process, requires only about one-half of the energy of the glass product, since it needs to be heated to only about 700° C. The product of the invention, when ground, has particle sizes between 0.4 and 0.8 mm giving a specific surface area exceeding 200 m$^2$/g, and for particle sizes below 0.4 mm, surface area between 200 and 300 m$^2$/g.

According to the invention there is provided a method of making a filtering medium in which basalt or lava powder having a mean particle size not exceeding 70$\mu$ is mixed with sodium and/or potassium metasilicate and with borax, the mixture so formed is sintered at from 700° to 900° C. the sintered mixture being treated with an inorganic acid at from 70° to 90° C. following which the acid is removed and the sintered mixture is washed with water and dried. The sintering step renders acid-soluble certain constituents of the basalt or lava so that they are readily extracted to increase the surface area of the particles.

Preferably, the mixture contains from 50 to 80% by weight of basalt or lava and from 10 to 20% by weight of borax, the balance being metasilicate.

The invention also relates to a filtering medium, comprising a sintered powder selected from basalt and lava powder, said medium having a specific surface area of at least 200 m$^2$/g for a mean particle size from 0.4 to 0.8 mm.

The sintering can be combined with a shaping operation, for example by sintering the mixture in steel molds if a unitary structure is desired, or it may be followed by grinding to a desired particle size if a particulate product is desired.

The sintered mixture may be washed at from 40° to 50° C., and may be dried at from 130° to 220° C. The dried sintered material may be sieved. In such a sieving operation, the material may be divided into fractions, for example into particle sizes exceeding 0.4 mm and less than 0.4 mm. The particle size range of 0.4 to 0.8 mm for the filter material generally has a specific surface area exceeding 200 m$^2$/g, while the fraction below 0.4 mm may have a specific surface area up to 300 m$^2$/g.

In the production of the filtering medium according to the present invention, it is not only possible to treat the product with acid after sintering but it is also possible to proceed by treating the basalt or lava powder before sintering directly with inorganic acids and then washing it, that is to say by placing the extraction operation ahead of the sintering and subjecting the raw, ground but not yet sintered material to an extraction operation with inorganic acids. By this acid treatment of the raw rather than the sintered material an especially advantageous filter surface is obtained. If desired and necessary, however, an acid treatment stage may be placed both ahead of and after the sintering operation of the basalt or lava powder, that is to say the raw basalt or lava powder may be treated directly with inorganic acids at temperatures between 70° and 90° C., the powder then washed with water, dried, then sintered between 700° and 900° C. after mixing with metasilicate and borax, whereupon the sintered material may be ground to the desired particle size and a renewed washing operation with inorganic acids as described above follows.

It has been found that in this washing operation with inorganic acids, for which purpose 25% hydrochloric acid or nitric acid or a mixture of these acids in a 1:1 or 1:2 ratio may be used, lanthanides are extracted. If it is desired to obtain as high a concentration as possible of lanthanides the acid washing operation or acid extraction can be carried out several times and at various stages.

Grinding of the sintered material can be carried out in a known device, for example a ball mill. The acid treatment stage has a favorable effect on the surface area of the filtering medium obtained.

It has been found that after acid treatment of the basalt or lava powder or the sintered material the used acid may contain as a by-product considerable quantities of lanthanides in the form of the chlorides or nitrates, the identities of the lanthanides depending upon the origin of the material. This acid extract can be further concentrated in known manner by evaporation. The chloride or nitrate extract can be further heated to remove the acids and the residue can be converted for instance into the oxides or into the metals, other metals such as sodium, potassium, calcium, iron and magnesium being previously removed. The metal can be precipitated on a special filter or a porous ceramic object during its preparation. The solution of the lanthanides in the inorganic acid or in the acid mixture constitutes a concentrate which may contain europium, samarium, lanthanum and scandium.

If the acid washing process is repeated several times in the production of the filtering medium, whether with the unsintered or with the sintered material, it is possible as already explained above to increase the yield of lanthanides appreciably and simultaneously to increase the specific surface area of the product. When carrying out extraction with acid or the acid mixture after the sintering process consideration must, however, be given to the fact that the materials added before the sintering process are also washed out or extracted at this stage.

Tests have shown that from two extraction stages with the sintering process between them and grinding of the sintered product using 100 kg of basalt from Lower Saxony, 3400 to 3600 g of a concentrate of lanthanides are obtained, and with once-only extraction 3000 to 3200 g. The concentrations of the individual lanthanides in the concentrate obtained by once-only acid washing, and after removal of potassium, sodium, calcium, iron and magnesium, are on average as follows:

europium ~ >0.44 mg/g concentrate
samarium ~ >52.72 mg/g concentrate lanthanum ~ >128.30 mg/g concentrate
scandium ~ >3.56 mg/g concentrate

DRAWINGS

Embodiments of the method of the invention are shown by way of example in the accompanying drawings, which are flow diagrams of processes according to the invention.

DESCRIPTION OF PARTICULAR EMBODIMENTS

FIG. 1 shows a process, in which the starting material, namely basalt powder, is first sintered and then ground and subsequently the ground material is extracted with inorganic acids. FIG. 1 also shows how the extraction acid and the washing water can be reprocessed to give the rare earths lanthanum, europium, samarium and scandium.

Figure 2:
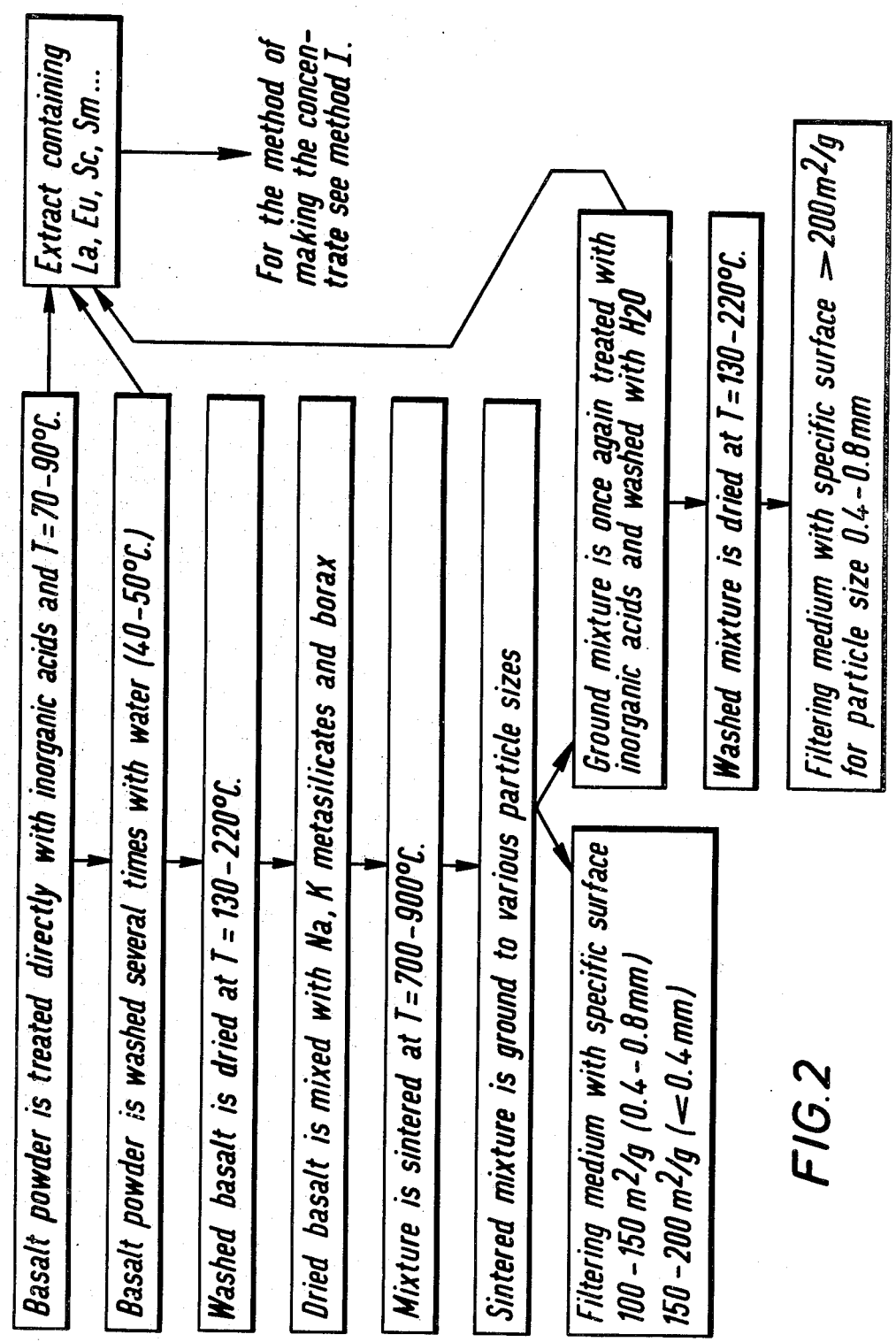

FIG. 2 shows a modification of the above-described method, in which first the raw starting material, namely basalt powder, is treated with acids, washed with water, dried and then sintered. FIG. 2 also shows in the right-hand column below the process, an after-treatment of the ground, sintered material with acids as a further alternative embodiment of the process according to this invention. The reprocessing of the extraction or washing acid and of the wash water is carried out at two points, namely firstly from the treatment of the starting material before sintering and finally from the treatment of the ground, sintered material, in other respects further as in FIG. 1.

What is claimed is:

1. A method for making a particulate filtering medium which comprises
   (a) admixing a powder having a particle size not exceeding 70 microns, selected from the group consisting of basalt and lava, with borax and a metasilicate selected from the group consisting of sodium metasilicate and potassium metasilicate,
   (b) sintering the mixture at a temperature between 700° and 900° C.,
   (c) grinding the sintered product,
   (d) treating the ground product with an inorganic acid,
   (e) washing the acid-treated product with water, to increase the specific surface area thereof and
   (f) drying the washed product to produce a particulate filter medium having a specific surface area in excess of 200 m²/g.

2. A method according to claim 1 in which the acid comprises at least one of hydrochloric and nitric acid of 25% by weight concentration.

3. A method according to claim 2, in which the acid comprises from 1 to 2 parts of nitric acid to 1 part of hydrochloric acid.

4. A method according to claim 1 in which the mixture contains from 50 to 80% by weight of basalt or lava powder and from 10 to 20% by weight of borax, the balance being one of said metasilicate.

5. The method of claim 1 which also includes the step of pretreating said basalt or lava powder with an inorganic acid followed by water washing prior to step (a).

6. The method of claim 1 in which the acid treatment is carried out at a temperature from 70° to 90° C. and the washing step is carried out at a temperature of from 40° to 50° C.

7. A method for making a shaped unitary filter medium which comprises
   (a) treating a powder having a particle size not exceeding 70 microns, selected from the group consisting of basalt and lava, with an inorganic acid
   (b) washing said powder to remove the acid and any materials extracted from said powder,
   (c) admixing the washed powder with borax and a metasilicate selected from the group consisting of sodium metasilicate and potassium metasilicate,
   (d) placing the mixture in a mold to shape it, and
   (e) sintering the mixture at a temperature between 700° and 900° C. to provide a unitary filter medium.

8. A method for making a filtering medium which comprises
   (a) admixing a powder having a particle size not exceeding 70 microns, selected from the group consisting of basalt and lava, with borax and a metasilicate selected from the group consisting of sodium metasilicate and potassium metasilicate,
   (b) sintering the mixture at a temperature between 700° and 900° C.,
   (c) treating the sintered product with an inorganic acid to extract lanthanides therefrom,
   (d) washing the acid treated product with water, and
   (e) drying the washed product to produce a particulate filter medium.

* * * * *